(No Model.) 2 Sheets—Sheet 1.

C. CORNELIUS & H. SCHILDHAUER.
PRESS FOR MAKING GLASS WASH BOARDS.

No. 424,049. Patented Mar. 25, 1890.

WITNESSES:
W. R. Davis
C. Sedgwick

INVENTOR
C. Cornelius
H. Schildhauer
BY Munn & Co.
ATTORNEY (No Model.) 2 Sheets—Sheet 2.
C. CORNELIUS & H. SCHILDHAUER.
PRESS FOR MAKING GLASS WASH BOARDS.
No. 424,049. Patented Mar. 25, 1890.
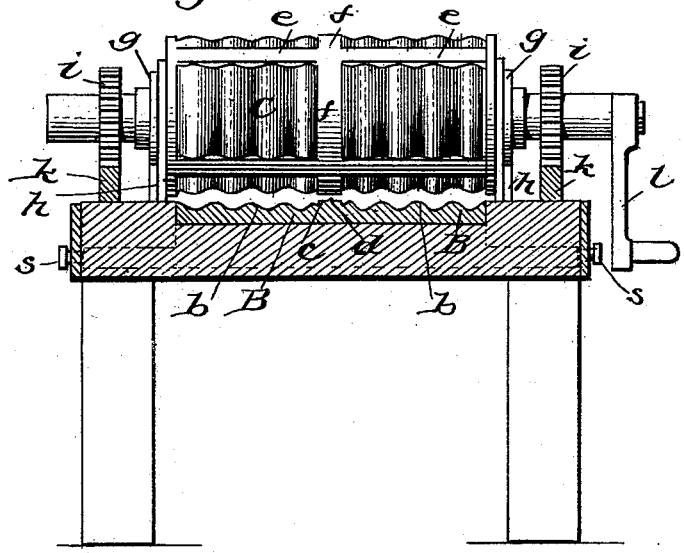
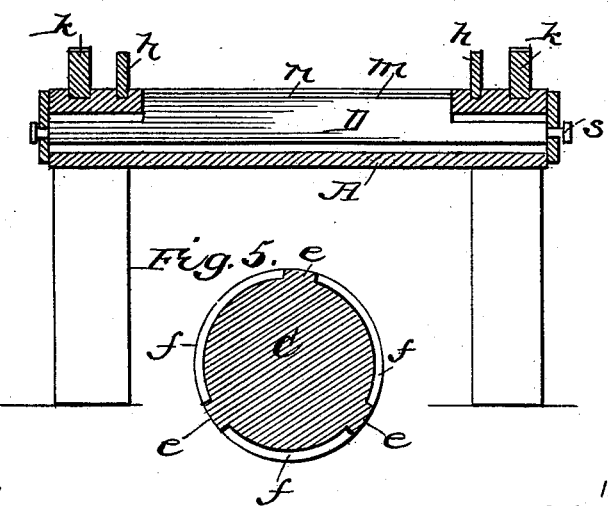
WITNESSES:
W. R. Davis.
C. Sedgwick.
INVENTOR
C. Cornelius
H. Schildhauer
BY Munn & Co.
ATTORNEY
N. PETERS, Photo-Lithographer, Washington, D. C.

UNITED STATES PATENT OFFICE.

CHARLES CORNELIUS AND HENRY SCHILDHAUER, OF NEILLSVILLE, WISCONSIN.

PRESS FOR MAKING GLASS WASH-BOARDS.

SPECIFICATION forming part of Letters Patent No. 424,049, dated March 25, 1890.

Application filed April 6, 1889. Serial No. 306,149. (No model.)

*To all whom it may concern:*

Be it known that we, CHARLES CORNELIUS and HENRY SCHILDHAUER, of Neillsville, in the county of Clark and State of Wisconsin, have invented a new and useful Improvement in Presses for Making Glass Wash-Boards, of which the following is a full, clear, and exact description.

This invention has for its object the making in a more rapid and cheaper manner glass plates corrugated on both sides for use as wash or rubbing boards, and preferably with plain margins on their opposite sides, to facilitate their fit and give them a steadier hold within the grooved frame of the complete article.

The invention consists in a press or apparatus of novel construction for the above purpose, the same including special features and combinations of parts whereby an extended series of such plates may be made at one operation and the glass is made to readily free itself from the surface on which it is pressed, substantially as hereinafter described, and pointed out in the claims.

Reference is to be had to the accompanying drawings, forming a part of this specification, in which similar letters of reference indicate corresponding parts in all the figures.

Figure 1:
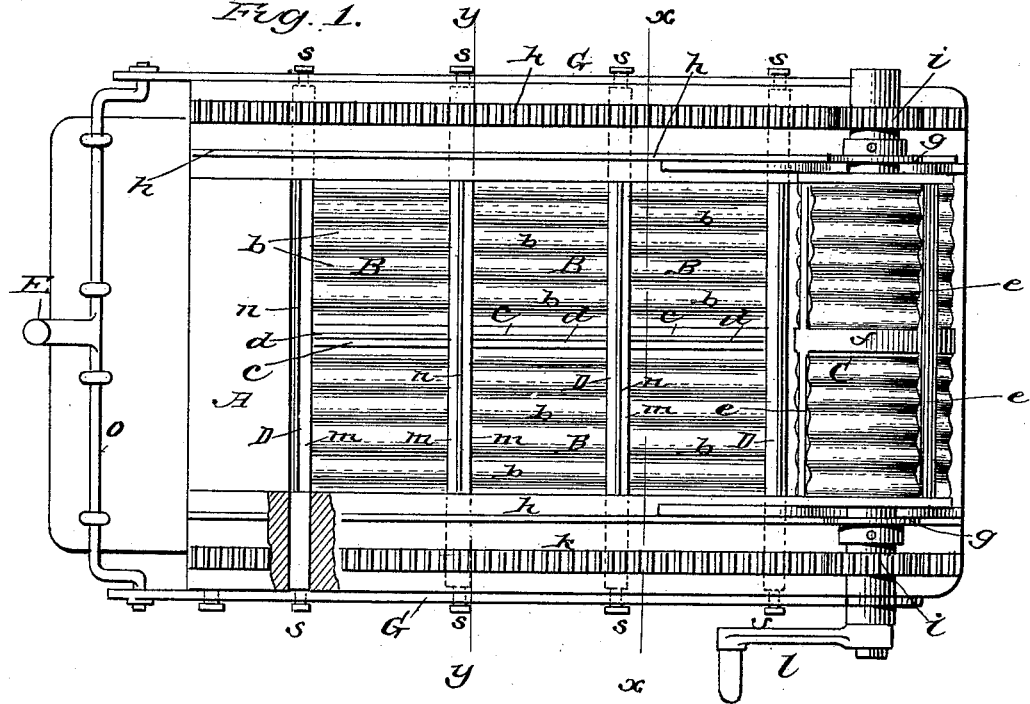
Figure 2:
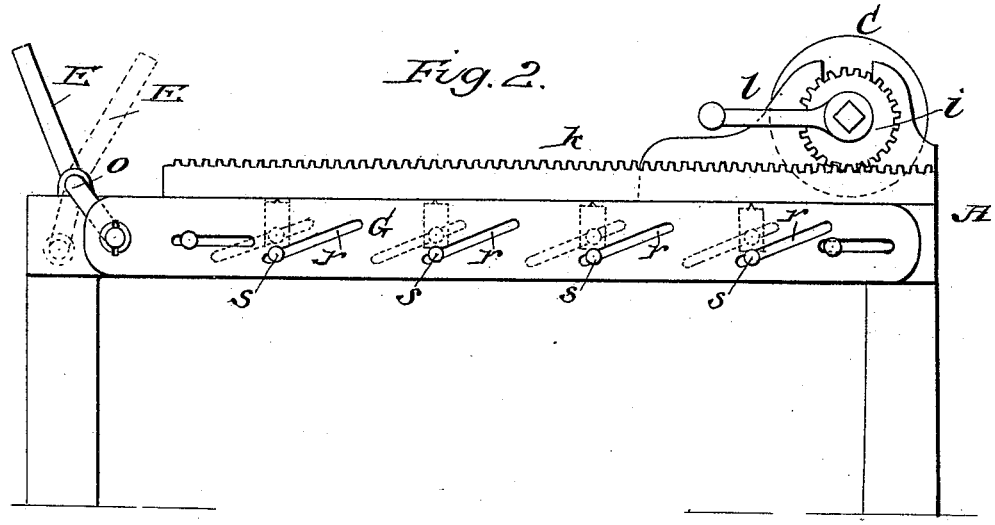

Figure 1 represents a plan view of the apparatus, and Fig. 2 is a side elevation of the same. Fig. 3 is a vertical section upon the line $x$ $x$ in Fig. 1, looking toward a corrugated roller which forms one of the pressing-surfaces. Fig. 4 is a vertical section upon the line $y$ $y$ in Fig. 1, looking in the reverse direction to Fig. 3; and Fig. 5 is a transverse section of the corrugated pressing-roller of the apparatus.

A is a bed-plate, which constitutes the pressing-table of the apparatus, and which may either be a stationary or floating one, but which is here shown stationary and supported upon suitable uprights. The upper portion of this pressing-table, which may be composed of a metal or other suitable plate, that is here supposed to be fast on the bed upon which it rests and virtually forms a part of it, is corrugated on its upper surface, the corrugations $b$ $b$ being in the direction of its length, and said corrugated surface being divided transversely of its length into a series of sections B B, one in the wake of the other, and preferably duplicated on opposite sides of a longitudinal central raised partition $c$, having a raised cutting-rib $d$ in each section B B, so as to increase the number of plates that may be made on the pressing-table at any one time, it being a main object to make a series of corrugated glass wash-boards or rubbing-plates by one operation as distinguished from making one or two at a time by an ordinary drop-press. Used in connection with this sectionally-corrugated pressing or bed plate A is a peripherally-corrugated roller C, of a suitable diameter and of a proper length to correspond with the width of the corrugated portion of the pressing-table, and so that the salient portions of its corrugations will face the depressed portions of the corrugations in the pressing-table. Said roller has its corrugations also divided up into sections corresponding in area to the corrugated sections B B of the pressing-table by means of longitudinal dividing-strips $e$ and a central peripheral dividing-strip $f$. Each of said corrugated table-sections and corrugated roller-sections is of sufficient extent to make the whole corrugated surface on both sides of so much of a glass plate resting in its heated or molten state on the bed as corresponds to the corrugated surface of a wash or rubbing board, and the series of such corrugated surfaces on the glass plate to make a series of glass wash-boards corrugated on their opposite sides is produced by running the corrugated roller C over and along the corrugated pressing plate or bed A, or rather over and along and on the whole sheet of glass resting upon the pressing-table. The corrugated roller C is supported and guided at its opposite ends by means of flanges $g$, arranged to run upon and along rails $h$ on opposite sides of the pressing-plate, and it is kept from twisting out of line and made to register as regards its corrugated sections and intervening spaces with the corrugations and dividing-spaces on the bed-plate as it is run and worked over the latter by means of pinions $o$ on its ends, arranged to gear with opposite side racks $k$ on the bed-plate or outer fixed framing, the roller being rotated to thus travel over and on the sheet of glass on the bed-plate by a crank $l$ on one of its ends or otherwise.

At the ends of and between the corrugations of the bed-plate—that is, at the sides of and between the corrugated sections B B—are a series of rising and falling bars D D, constructed to present longitudinal flat margins $m$ and a raised rib or cutting-edge $n$. These bars, during the rolling of the corrugated roller C over the glass on the pressing-plate, and with which the longitudinal partitions $e$ in the roller register, are raised sufficiently through suitable openings in the bed-plate to form at the ends of the corrugations smooth marginal sides on and between each wash-board section of the glass as formed by the corrugated sections of the bed-plate and roller, so that each glass wash-board produced will have smooth marginal sides outside of the corrugations, to facilitate the fitting and holding it without shake or liability to break or jar within the usual grooved sides of an ordinary wash-board frame.

The longitudinal central partitions $c$, with their raised cutting-rib $d$, and with which the peripheral dividing-strip $f$ registers, have a like action to the bars D, with their ribs and longitudinal strips $e$, on the roller to form smooth marginal ends on each glass wash-board, while the sharp edges or cutting-ribs $n$ and $d$ of the bars D and bed A serve to mark out and partially cut through the glass on the table to divide it afterward, by small extra cutting, into a series of independent glass wash-boards corrugated on their opposite sides and with flat marginal sides. Before the glass, however, is thus finally cut up, and as the roller C completes its travel over the entire glass on the pressing-table, the bars D are dropped or lowered to facilitate the removal of the glass from off the table at its front or open end. This dropping of the bars D is an important feature, and the whole series of said bars may be simultaneously raised or lowered, as required, by the working backward or forward, according as the bars are to be raised or lowered, of a single lever E, connected with a rotatable cross-bar $o$ at the back end of the bed, which cross-bar is cranked at its ends and connected at such parts with longitudinally-sliding bars G on opposite sides of the bed-frame. These sliding bars G have oblique slots $r$ cut in them, within which wrist-pins $s$ on the ends of the bars D fit, and whereby said bars D are raised or lowered, as required, accordingly as the sliding bars G are moved by the lever E forward or backward. This raising and lowering mechanism of the bars D by the action of a single lever gives a positive action on both sides of the apparatus, and the whole will work freely and perfectly, no matter how many there may be of said bars D. The drop-bars D will enable a manufacturer of glass wash-boards to make a large number of such boards in the same time that he could make a single one with an ordinary drop-press, and said glass wash-boards will be made more perfect. The corrugations on the plates may either be uniform or irregular on the opposite sides or surfaces of the plates.

Having thus described our invention, what we claim as new, and desire to secure by Letters Patent, is—

1. In a press for making glass wash-boards corrugated on their opposite sides or surfaces, the combination, with the peripherally and sectionally corrugated roller and longitudinally and sectionally corrugated table, of a series of rising and falling bars arranged transversely and within the table between the corrugations on its surface and mechanism for operating said bars from their opposite ends, substantially as and for the purpose or purposes specified.

2. In combination with the longitudinally and sectionally corrugated table, a series of drop or rising and falling bars arranged transversely and within the table between the corrugations on its surface and provided with cutting ribs or edges on their upper surface, essentially as described.

3. The lever E, with its attached crank-rod $o$, in combination with the longitudinally and sectionally corrugated table A, the rising and falling cross-bars D within the table, and the obliquely-slotted sliding bars G on opposite sides of the table and connected with the ends of said cross-bars for operation of the latter from opposite sides of table by the manipulation of the lever E, essentially as de scribed.

CHARLES CORNELIUS.
HENRY SCHILDHAUER.

Witnesses:
C. A. YOUMANS,
M. C. RING.